(12) United States Patent
Ohishi

(10) Patent No.: US 8,392,523 B2
(45) Date of Patent: Mar. 5, 2013

(54) IMAGE FORMING APPARATUS FOR DETERMINING THE AVAILABILITY OF APPLICATION PROGRAM INTERFACES

(75) Inventor: Tsutomu Ohishi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1094 days.

(21) Appl. No.: 11/248,288

(22) Filed: Oct. 13, 2005

(65) Prior Publication Data

US 2006/0082801 A1 Apr. 20, 2006

(30) Foreign Application Priority Data

Oct. 18, 2004 (JP) ................. 2004-303135
Oct. 6, 2005 (JP) ................. 2005-293892

(51) Int. Cl.
*G06F 3/12* (2006.01)
*G06F 15/16* (2006.01)
*G06F 17/00* (2006.01)
*G06F 15/177* (2006.01)
*G06K 15/10* (2006.01)

(52) U.S. Cl. ..... 709/217; 358/1.13; 358/1.15; 358/1.18; 715/274; 715/734

(58) Field of Classification Search ................. 358/1.13, 358/1.15, 1.18; 709/217; 715/274, 734
See application file for complete search history.

(56) References Cited

U.S. PATENT DOCUMENTS

| | | | |
|---|---|---|---|
| 2001/0048774 A1* | 12/2001 | Seki et al. ................. | 382/305 |
| 2002/0054326 A1* | 5/2002 | Morita ................. | 358/1.15 |
| 2003/0053127 A1* | 3/2003 | Wu et al. ................. | 358/1.15 |
| 2003/0133136 A1 | 7/2003 | Ohishi et al. | |
| 2003/0140174 A1 | 7/2003 | Ohishi et al. | |
| 2003/0218765 A1* | 11/2003 | Ohishi et al. ................. | 358/1.13 |
| 2004/0057067 A1 | 3/2004 | Ohishi et al. | |
| 2004/0057074 A1 | 3/2004 | Ohishi et al. | |
| 2004/0075857 A1* | 4/2004 | Akiyoshi et al. ............ | 358/1.13 |
| 2004/0119751 A1* | 6/2004 | Yoshimi et al. ................ | 345/773 |
| 2004/0125414 A1 | 7/2004 | Ohishi et al. | |
| 2004/0128532 A1 | 7/2004 | Ohishi et al. | |
| 2004/0130747 A1 | 7/2004 | Ohishi et al. | |
| 2004/0218208 A1 | 11/2004 | Akiyoshi et al. | |
| 2005/0057771 A1 | 3/2005 | Ohishi et al. | |
| 2005/0060564 A1* | 3/2005 | Murakami et al. ............ | 713/200 |
| 2005/0226641 A1* | 10/2005 | Ando et al. ................. | 399/8 |

FOREIGN PATENT DOCUMENTS

| | | |
|---|---|---|
| JP | 2002-082806 | 3/2002 |
| JP | 2002-84383 | 3/2002 |
| JP | 2004-013349 | 1/2004 |

OTHER PUBLICATIONS

U.S. Appl. No. 11/495,569, filed Jul. 31, 2006, Ohishi.

* cited by examiner

*Primary Examiner* — Peter Shaw
(74) *Attorney, Agent, or Firm* — Oblon, Spivak, McClelland, Maier & Neustadt, L.L.P.

(57) ABSTRACT

An image forming apparatus including a plurality of programs of which an interface is open to public so that an application created according to the interface is executable. The image processing apparatus also determines the availability of a plurality of application program interfaces mounted at the image forming apparatus that are available to the application upon execution of the application. The operation of the application may then be affected by the available application program interfaces.

17 Claims, 20 Drawing Sheets

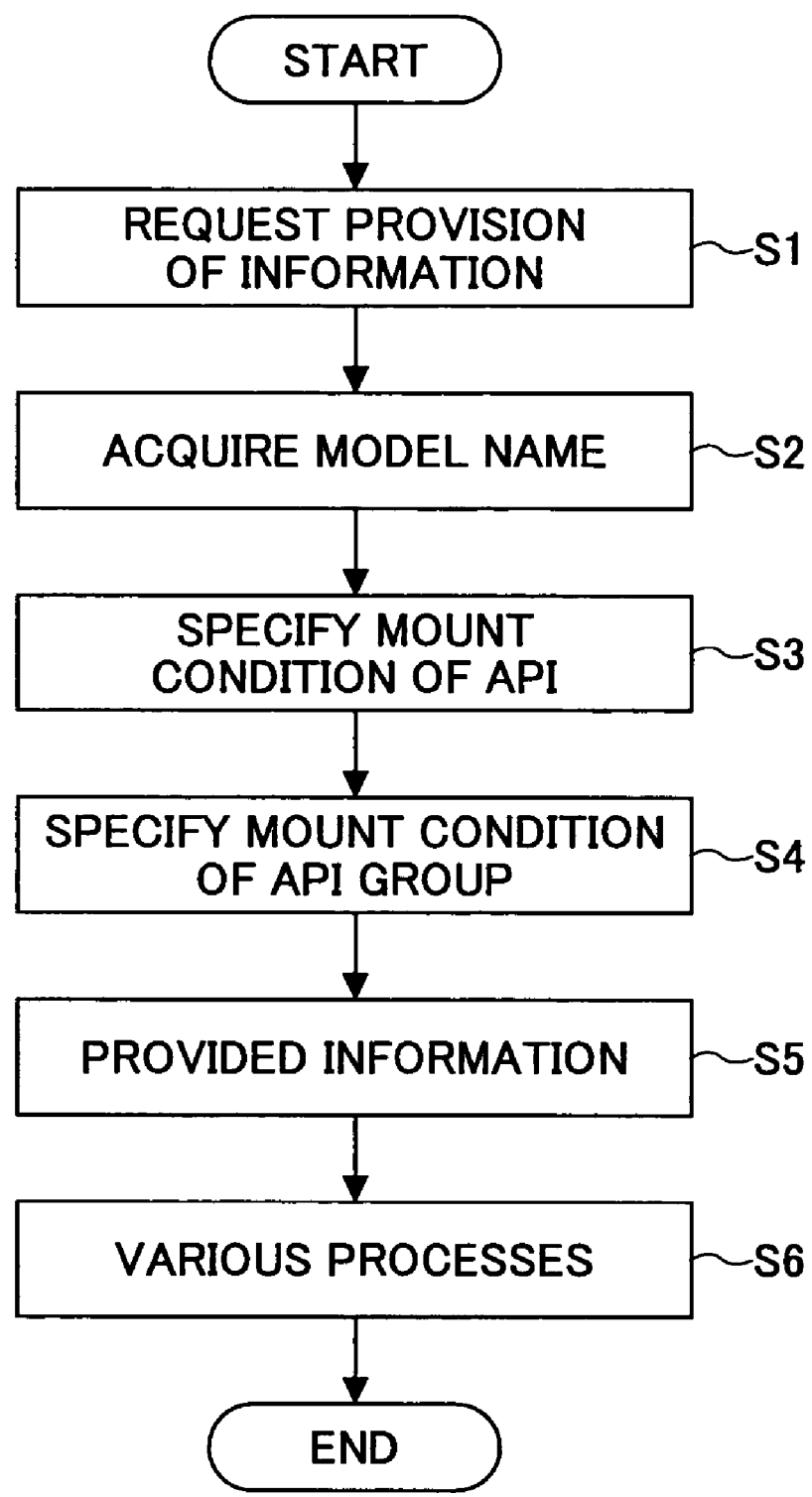

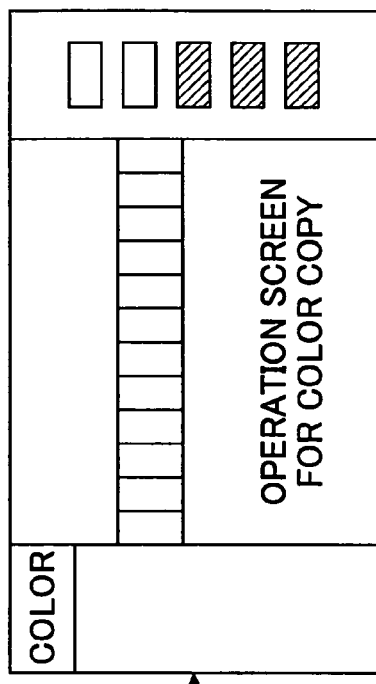
FIG.9A
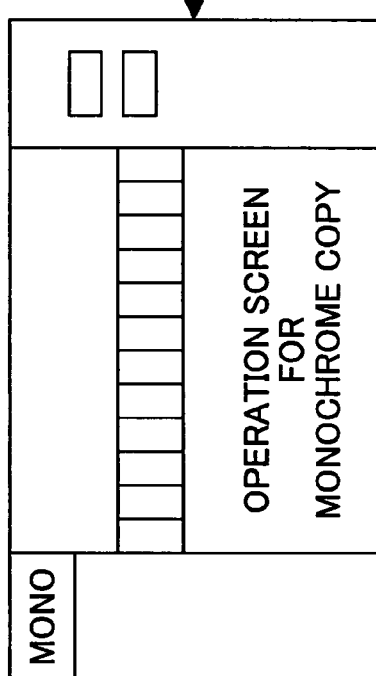
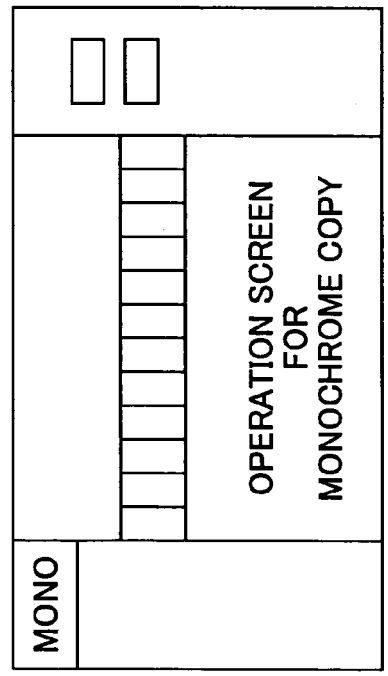
FIG.9B

FIG.12

| API GROUP | API | OPERATION CHECKED VERSION | VALIDITY |
|---|---|---|---|
| ALL API GROUP | — | 1.50 | VOID |
| MONOCHROME SCAN API GROUP | self | 1.10 | VOID |
| | scanFunc001 | 1.01 | VOID |
| | scanFunc002 | 1.22 | VOID |
| | scanFunc003 | 1.12 | VOID |
| COLOR SCAN API GROUP | self | 1.20 | VOID |
| | MONOCHROME SCAN API GROUP | 1.10 | VOID |
| | scanFunc004 | 1.33 | VOID |

| FUNCTION | EXPLANATION OF FUNCTION |
|---|---|
| int getAPIVersion( char*iversion_string ) | ACQUIRE VERSION OF ALL API GROUPS |
| int getMonoScanAPIVersion( char* version_string) | ACQUIRE VERSION OF MONOCHROME SCAN FUNCTION API GROUP |
| int getColorScanAPIVersion( char* verion_string ) | ACQUIRE VERSION OF COLOR SCAN FUNCTION API GROUP |
| int getScanFuncXXXVersion(char* verion_string ) | ACQUIRE VERSION OF SCAN FUNCTION API |
| int getPrintAPIVersion( char* verion_string) | ACQUIRE VERSION OF PRINT FUNCTION API GROUP |
| int getPrintFuncXXXXVersion(char* verion_string) | ACQUIRE VERSION OF PRINT FUNCTION API |
| int getFaxAPIVersion( char* verion_string ) | ACQUIRE VERSION OF FAX API GROUP |
| int getFaxFuncXXXVersion(char* verion_string ) | ACQUIRE VERSION OF FAX API |
| int getCopyAPIVersion( char* verion_string) | ACQUIRE VERSION OF COPY FUNCTION API GROUP |
| int getCopyFuncXXXXVersion(char* verion_string ) | ACQUIRE VERSION OF COPY FUNCTION API |
| int getNetAPIVersion( char* verion_string ) | ACQUIRE VERSION OF NETWORK FUNCTION API GROUP |
| int getNetFuncXXXVersion(char* verion_string ) | ACQUIRE VERSION OF NETWORK FUNCTION API |
| int getSecurityAPIVersion( char* verion_string) | ACQUIRE VERSION OF SECURITY FUNCTION API GROUP |
| int getSecurityFuncXXXVersion(char* verion_string ) | ACQUIRE VERSION OF SECURITY FUNCTION API |

FIG.14

| API GROUP | API | OPERATION CHECKED VERSION | VALIDITY |
|---|---|---|---|
| ALL API GROUP | — | 1.50 | REDY |
| MONOCHROME SCAN API GROUP | self | 1.10 | REDY |
| | scanFunc001 | 1.01 | REDY |
| | scanFunc002 | 1.22 | REDY |
| | scanFunc003 | 1.12 | REDY |
| COLOR SCAN API GROUP | self | 1.20 | REDY |
| | MONOCHROME SCAN API GROUP | 1.10 | REDY |
| | scanFunc004 | 1.33 | REDY |

| API GROUP | API | OPERATION CHECKED VERSION | VALIDITY |
|---|---|---|---|
| ALL API GROUP | — | 1.50 | VOID |
| MONOCHROME SCAN API GROUP | self | 1.10 | READY |
| | scanFunc001 | 1.01 | REDAY |
| | scanFunc002 | 1.22 | READY |
| | scanFunc003 | 1.12 | READY |
| COLOR SCAN API GROUP | self | 1.20 | VOID |
| | MONOCHROME SCAN API GROUP | 1.10 | VOID |
| | scanFunc004 | 1.33 | VOID |

FIG.16

| API GROUP | API | OPERATION CHECKED VERSION | VALIDITY |
|---|---|---|---|
| ALL API GROUP | — | 1.50 | VOID |
| MONOCHROME SCAN API GROUP | self | 1.10 | READY |
| | scanFunc001 | 1.01 | REDAY |
| | scanFunc002 | 1.22 | READY |
| | scanFunc003 | 1.12 | READY |
| COLOR SCAN API GROUP | self | 1.20 | VOID |
| | MONOCHROME SCAN API GROUP | 1.10 | READY |
| | scanFunc004 | 1.33 | VOID |

FIG.17

| API GROUP | API | OPERATION CHECKED VERSION | VALIDITY |
|---|---|---|---|
| ALL API GROUP | — | 1.50 | PARTLY |
| MONOCHROME SCAN API GROUP | self | 1.10 | READY |
| | scanFunc001 | 1.01 | REDAY |
| | scanFunc002 | 1.22 | READY |
| | scanFunc003 | 1.12 | READY |
| COLOR SCAN API GROUP | self | 1.20 | VOID |
| | MONOCHROME SCAN API GROUP | 1.10 | READY |
| | scanFunc004 | 1.33 | VOID |

```
#define VAS_Version "2.31"

#define scanFunc00Ver "1.05"
#define scanFunc003Ver "1.01"

#define printFunc00Ver "1.02"
#define printFunc003Ver "1.03"
            :
```

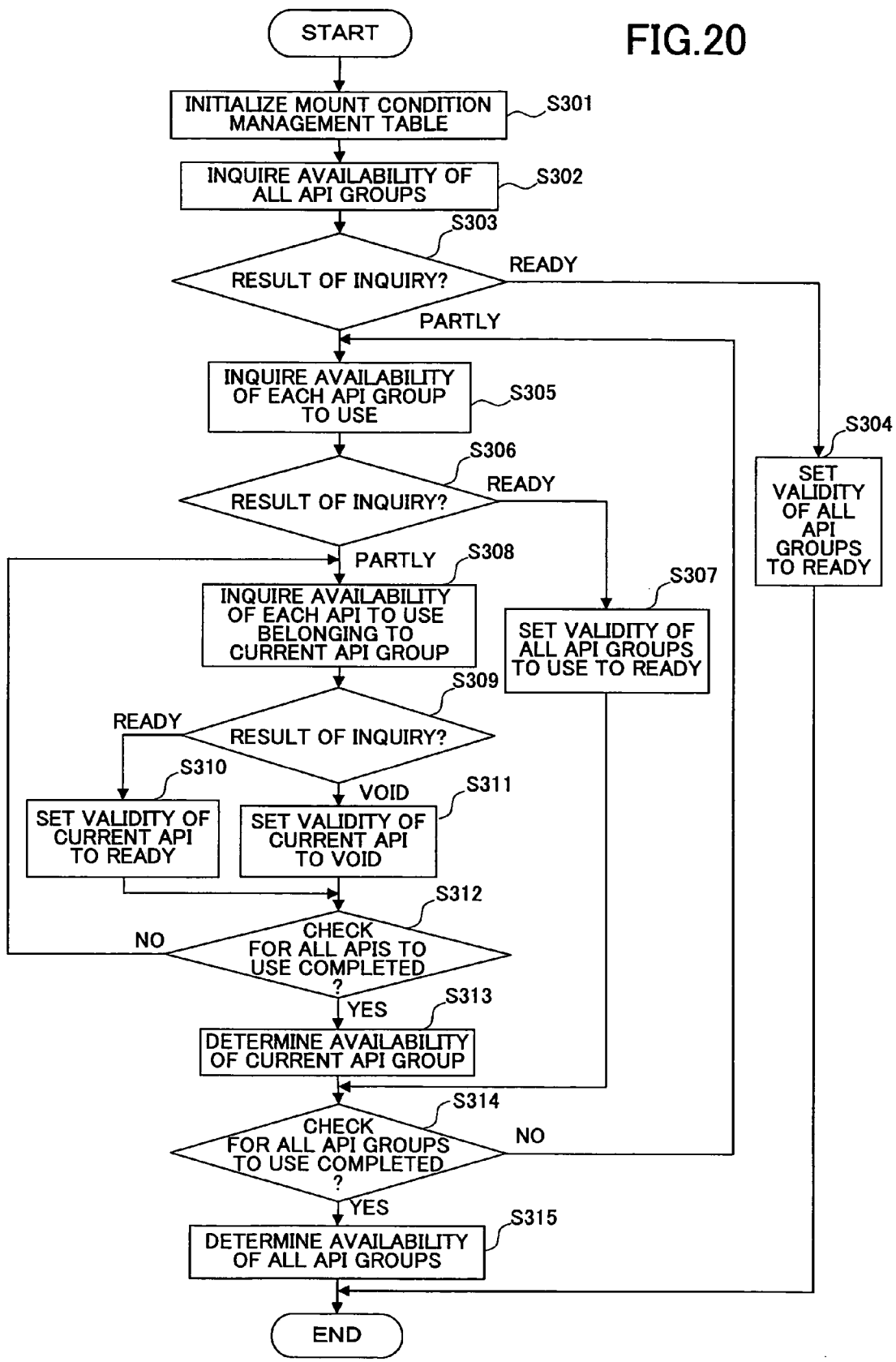

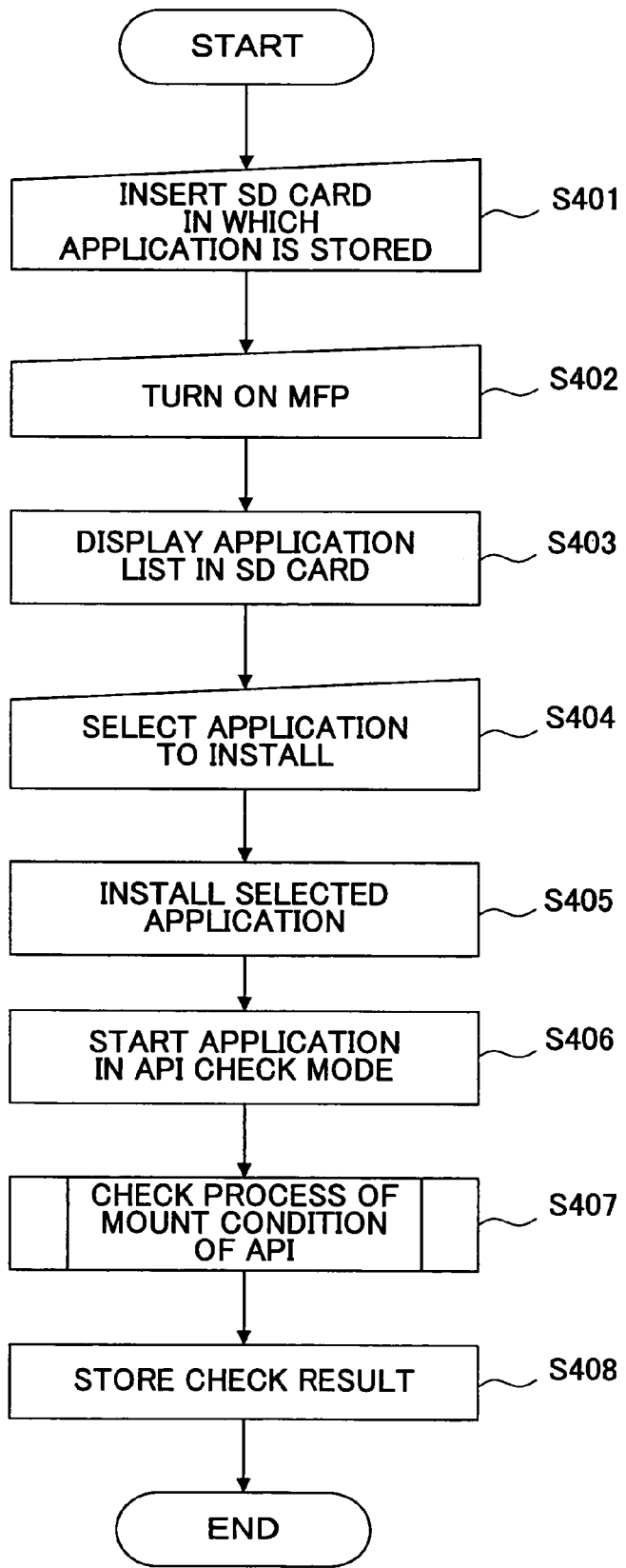

US 8,392,523 B2

IMAGE FORMING APPARATUS FOR DETERMINING THE AVAILABILITY OF APPLICATION PROGRAM INTERFACES

BACKGROUND OF THE INVENTION

1. Field of the Invention

The present invention generally relates to image forming technique and, more particularly, to an image forming apparatus such as a copy machine, a printer, a scanner, a facsimile, a composite apparatus, a Multi Function Peripheral, etc., and an information processing method, an information processing program and a recording medium such as an SD card.

2. Description of the Related Art

In recent years, composite apparatuses or Multi Function Peripherals (MFPs) having a copy function or facility, a scanner function or facility and a facsimile function or facility have been marketed. When the composite apparatus or MFP functions as a copying apparatus or a printer, an image is printed on a printing medium such as paper. When the composite apparatus or MFP functions as a copying apparatus or a scanner, an image is read from a document. When the composite apparatus or MFP functions as a facsimile apparatus, an image is set to or received from another equipment via a telephone line.

In the composite apparatus and the MFP, various kinds of information processing are performed according to various programs such as an application or a platform. Various applications are mounted to the composite apparatus and the MFP, such as an application for color copy, an application for monochrome copy, or an application for facsimile.

If the application for color copy can be mounted to either a color copy machine or a monochrome copy machine, it is convenient because an operation screen for monochrome copy by the application for color copy can be used by ether of the color copy machine and the monochrome copy machine. Similarly, if an application of various kinds of function of image forming apparatuses can be mounted to various kinds of image forming apparatuses, it is convenient because the application of various kinds of function of image forming apparatuses can be used by various kinds of image forming apparatuses. In this case, the application must selectively use APIs of different image forming apparatuses for each image forming apparatus. However, generally there are several hundreds kinds of API of image forming apparatuses, and it is difficult for an application to selectively use the APIs.

SUMMARY OF THE INVENTION

It is a general object of the present invention to provide an improved and useful image forming apparatus, an image processing method, an image processing program and a recording medium storing an image forming program in which the above-mentioned problems are eliminated.

A more specific object of the present invention is to provide an image forming apparatus, an information processing method, an information processing program and a recording medium storing an information processing program, in which an application mounted to an image forming apparatus can easily check a status of mounting an API in the image forming apparatus.

In order to achieve the above-mentioned objects, there is provided according to one aspect of the present invention an image forming apparatus comprising: a plurality of programs of which an interface is open to public so that an application created according to the interface is executable; and a mount condition providing part that provides information indicating a mount condition of a group constituted by a plurality of the programs in accordance with a request made by the application.

According to the image forming apparatus of the present invention, the application can easily check the mount condition of APIs in the image forming apparatus.

In the above-mentioned image forming apparatus, the application may control an operation control of the application based on the information indicating the mount condition provided by the mount condition providing part. Additionally, the application may limit a function provided by the application based on the information indicating the mount condition of the program provided by the mount condition providing part.

In the above-mentioned image forming apparatus, the application may change contents of a screen displayed on an operation panel of the image forming apparatus based on the information indicating the mount condition of the program provided by the mount condition providing part. Additionally, the application may display the screen so that a function and an operation not limited is permitted based on the information indicating the mount condition of the program provided by the mount condition providing part.

In the image forming apparatus according to the present invention, the mount condition may be determined for each program belonging to the group in accordance with the information indicating the mount condition of the program provided by the mount condition providing part.

Additionally, there is provided according to other aspects of the present invention an information processing method performed by the above-mentioned image forming apparatus, an information processing program for causing the image forming apparatus to perform the image forming method, and a recording medium storing such an information processing program.

Other objects, features and advantages of the present invention will become more apparent from the following detailed description when read in conjunction with the accompanying drawings.

BRIEF DESCRIPTION OF THE DRAWINGS

FIG. 8 is a flowchart of the check process of the mount condition of the APIs in the first embodiment of the present invention;

FIGS. 9A and 9B are illustrations for explaining a first example of an operation screen;

FIG. 12 is a diagram showing a mount condition management table after initialization;

FIG. 13 is a diagram showing an example of a mount condition acquisition function;

FIG. 14 is a diagram showing an updated state of the mount condition management table when a mounted version is determined as not old with respect to all API groups;

FIG. 15 is a diagram showing an updated state of the mount condition management table when the mounted version is not old with respect one use API group;

FIG. 16 is a diagram showing an updated state of the mount condition management table when availability of a use API group is determined based on a result of determination of availability of each use API;

FIG. 17 is a diagram showing an updated state of the mount condition management table when availability of all API groups is determined based on a result of determination of availability of each use API group;

FIG. 19 is a diagram showing an example of a version of API groups and APIs written in a source code of the JSDK application;

FIG. 20 is a flowchart for explaining a check process of a mount condition of APIs according to a third embodiment of the present invention; and FIG. 21 is a flowchart for explaining an installation process of the JSDK application accompanying the check process of a mount condition of APIs.

DETAILED DESCRIPTION OF THE PREFERRED EMBODIMENTS

Figure 1:
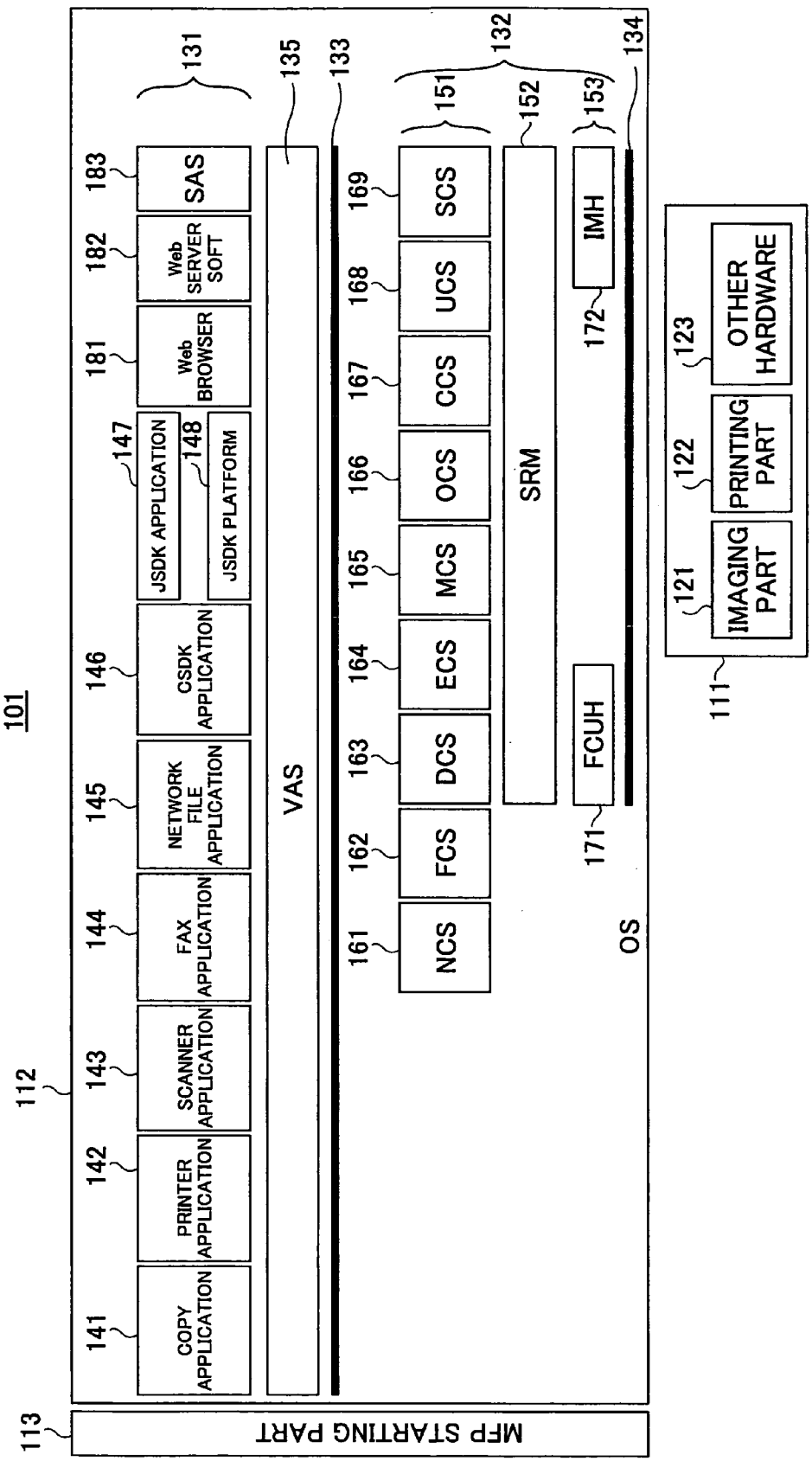
FIG. 1 is a diagram showing an MFP corresponding to an embodiment of the present invention.

FIG. 1 shows an MFP 101 corresponding to an embodiment of the present invention. The MFP 101 shown in FIG. 1 includes various kinds of hardware 111, various kinds of software 112, and an MFP starting (or booting) part 113.

The hardware 111 of the MFP 101 includes an imaging part 121, a printing part 122, and other hardware 123. The imaging part 121 is a hardware for reading an image (image data) from a document. The printing part 122 is a hardware for printing an image (image data) on a printing medium such as paper.

The software 112 of the MFP 101 includes various kinds of applications 131 and various kinds of platforms 132. These programs are executed in parallel in units of processes by an Operating System (OS) such as UNIX (registered trademark).

The applications 131 include a copy application 141 for the copy function or facility, a printer application 142 for the printer function or facility, a scanner application 143 for the scanner function or facility, a facsimile application 144 for the facsimile function or facility, a network file application 145 for the network file function or facility. Additionally, there are a Web browser 181 for the Web client, Web server software 182 which is software for distribution of Web pages and an SDK application service (SAS) 183 which is software for controlling a CSDK application or a JSDK application 147.

The applications 131 may be developed by use of an exclusive Software Developing Kit (SDK). The application 131 that is developed by use of the SDK will be referred to as an "SDK application". Exclusive SDKs include a "CSDK" for developing the application 131 in the C language, and a "JSDK" for developing the application 131 in the Java language. The application 131 that is developed by use of the CSDK will be referred to as a "CDSK application", and the application 131 that is developed by use of the JSDK will be referred to as a "JSDK application". A CSDK application 146 and a JSDK application 147 exist in the MFP 101 shown in FIG. 1. The MFP 101 shown in FIG. 1 further includes a JSDK platform 148, as the software 112 that intermediates between the JSDK application 147 that is written in the Java language and the other software 112 that is written in the C language.

The platforms 132 include various kinds of control services 151, a System Resource Manager (SRM) 152, and various kinds of handlers 153. The control services 151 include a Network Control Service (NCS) 161, a Facsimile Control Service (FCS) 162, a Delivery Control Service (DCS) 163, an Engine Control Service (ECS) 164, a Memory Control Service (MCS) 165, an Operation Panel Control Service (OCS) 166, a Certification Control Service (CCS) 167, a User-directory Control Service (UCS) 168, and a System Control Service (SCS) 169. The handlers 153 include a Facsimile Control Unit Handler (FCUH) 171 and an Image Memory Handler (IMH) 172.

The process of the NCS 161 includes intermediating the network communication. The process of the FCS 162 includes providing the facsimile API. The process of the DCS 163 includes control related to the stored document distributing process. The process of the ECS 164 includes control related to the imaging part 121 and the printing part 122. The process of the MCS 165 includes control related to the memory and the Hard Disk Drive (HDD). The process of the OCS 166 includes control related to the operation panel. The process of the CCS 167 includes control related to the authentication process and the accounting process. The process of the UCS 168 includes control related to the user information management. The process of the SCS 169 includes control related to the system management.

A Virtual Application Service (VAS) 135 exists as one of the software 112 that intermediate between the applications 131 and the platforms 132. The VAS 135 operates as a server process that regards the application 131 as the client, and operates as a client process that regards the platform 132 as the server. The VAS 135 includes a rapping function that conceals the platform 132 when viewed from the application 131, and has a role of absorbing a version difference when the version of the platform 132 is upgraded.

The MFP start part 113 is first executed when the power of the MFP 101 is turned ON. Hence, the OS such as the UNIX is started, and the applications 131 and the platforms 132 are started. These programs are stored in the HDD or memory card, reproduced from the HDD or memory card, and loaded into the memory.

Figure 2:
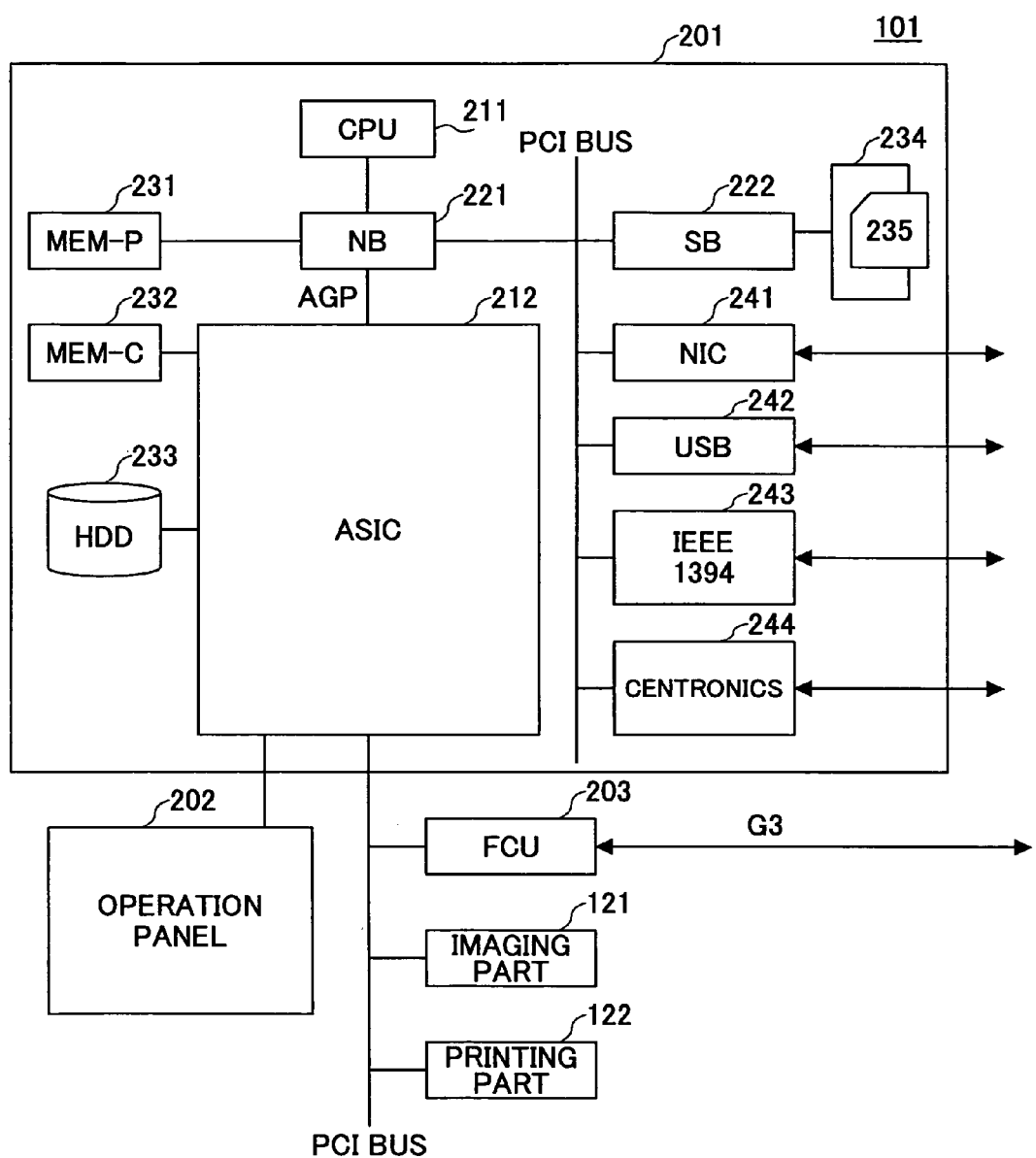
FIG. 2 is a diagram showing a hardware structure of the MFP shown in FIG. 1.

FIG. 2 is a diagram showing a hardware structure related to the MFP 101 shown in FIG. 1. The hardware 111 of the MFP 101 includes a controller 201, an operation panel 202, a Facsimile Control Unit (FCU) 203, the imaging part 121 and the printing part 122.

The controller 201 includes a CPU 211, an ASIC 212, a North Bridge (NB) 221, a South Bridge (SB) 222, a system memory (MEM-P) 231, a local memory (MEM-C) 232, a HDD 233, a memory card slot 234, a Network Interface Controller (NIC) 241, an USB device 242, an IEEE1394 device 243, and a Centronics device 244.

The CPU 211 is an IC for processing various kinds of information. The ASIC 212 is an IC for processing various kinds of images. The NB 221 is the north bridge of the controller 201. The SB 222 is the south bridge of the controller 201. The system memory (MEM-P) 231 is the system memory of the MFP 101. The local memory (MEM-C) 232 is the local memory of the MFP 101. The HDD 233 is a storage of the MFP 101. The memory card slot 234 is a slot for setting a memory card 235. The NIC 241 is a controller for network communication using the MAC address. The USB device 242 is a device for providing connection terminals of the USB standard. The IEEE1394 device 243 is a device for providing connection terminals of the IEEE1394 standard. The Centronics device 244 is a device for providing connection terminals of Centronics specifications.

The operation panel 202 forms a hardware (operation part) that is operated by an operator to make an input to the MFP 101, and also forms a hardware (display part) for the operator to obtain an output from the MFP 101.

Figure 3:
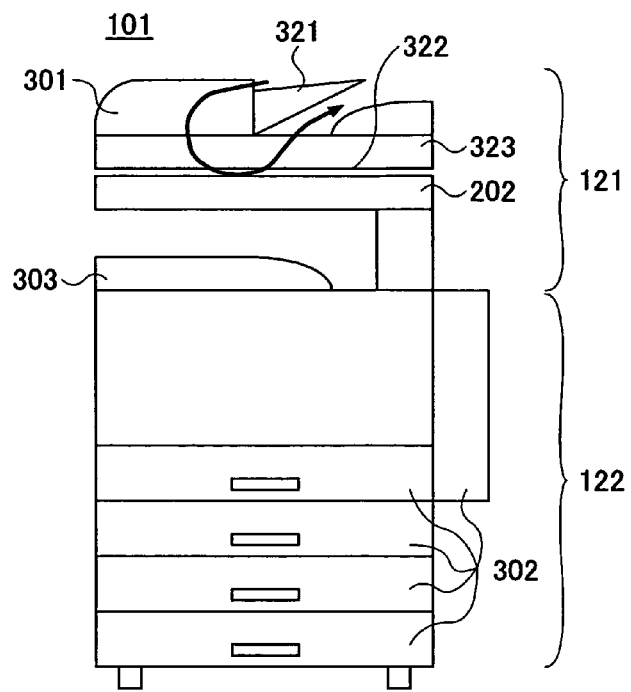
FIG. 3 is a diagram showing an external appearance of the MFP shown in FIG. 1.

FIG. 3 is a diagram showing an external appearance of the MFP 101 shown in FIG. 1. FIG. 3 shows a position of the imaging part 121, a position of the printing part 122, and a position of the operation panel 202. FIG. 3 further shows a document set part 301 where the documents to be read are set, a paper supply part 302 from where the printing paper is supplied, and a paper eject part 303 to where the printing paper is ejected. The document set part 301 is a constituent element of the imaging part 121. The paper supply part 302 is a constituent element of the printing part 122. The printing part 122 is a constituent element of the printing part 122.

Figure 4:
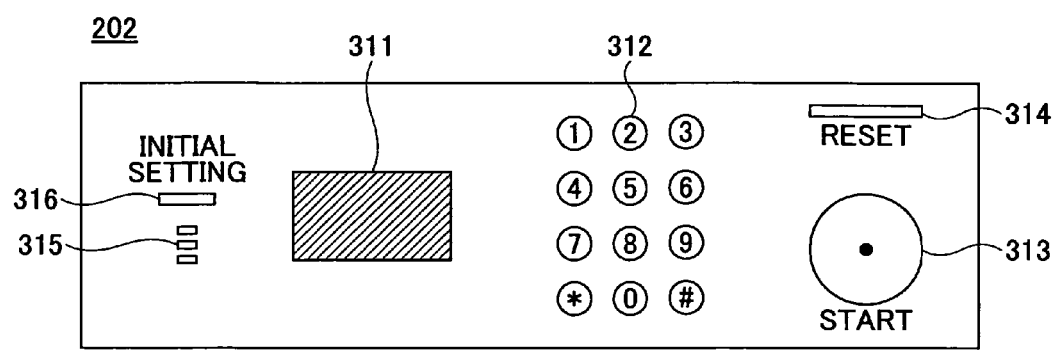
FIG. 4 is a diagram showing an operation panel.

FIG. 4 is a diagram showing the operation panel 202. As shown in FIG. 4, the operation panel 202 includes a touch panel 311, a ten-key 312, a start button 313, a reset button 314, function keys 315, and an initial setting button 316. The touch panel 311 is a hardware (touch operation part) for making the input by a touch operation, and is also a hardware (screen display part) for obtaining the output by a screen display. The ten-key 312 is a hardware for making a numerical input by a key (button) operation. The start button 313 is a hardware for making a start operation by a button operation. The reset button 314 is a hardware for making a reset operation by a button operation. The function key 315 is a hardware for displaying an operation screen by the CSDK 146 or the JSDK 147 by a key (button) operation. The initial setting button 316 is a hardware for displaying an initial setting screen by a button operation.

The document set part 301 includes an Automatic Document Feeder or feeding unit (ADF) 321, a flat bed 322, and a flat bed cover 323. The paper supply part 302 is formed by 4 paper supply trays. The paper eject part 303 is formed by 1 paper eject tray. A plurality of documents to be read (hereinafter also referred to as reading documents) can be set on the ADF 321. The reading document is set face down on the flat bed 322.

(JSDK)

Figure 5:
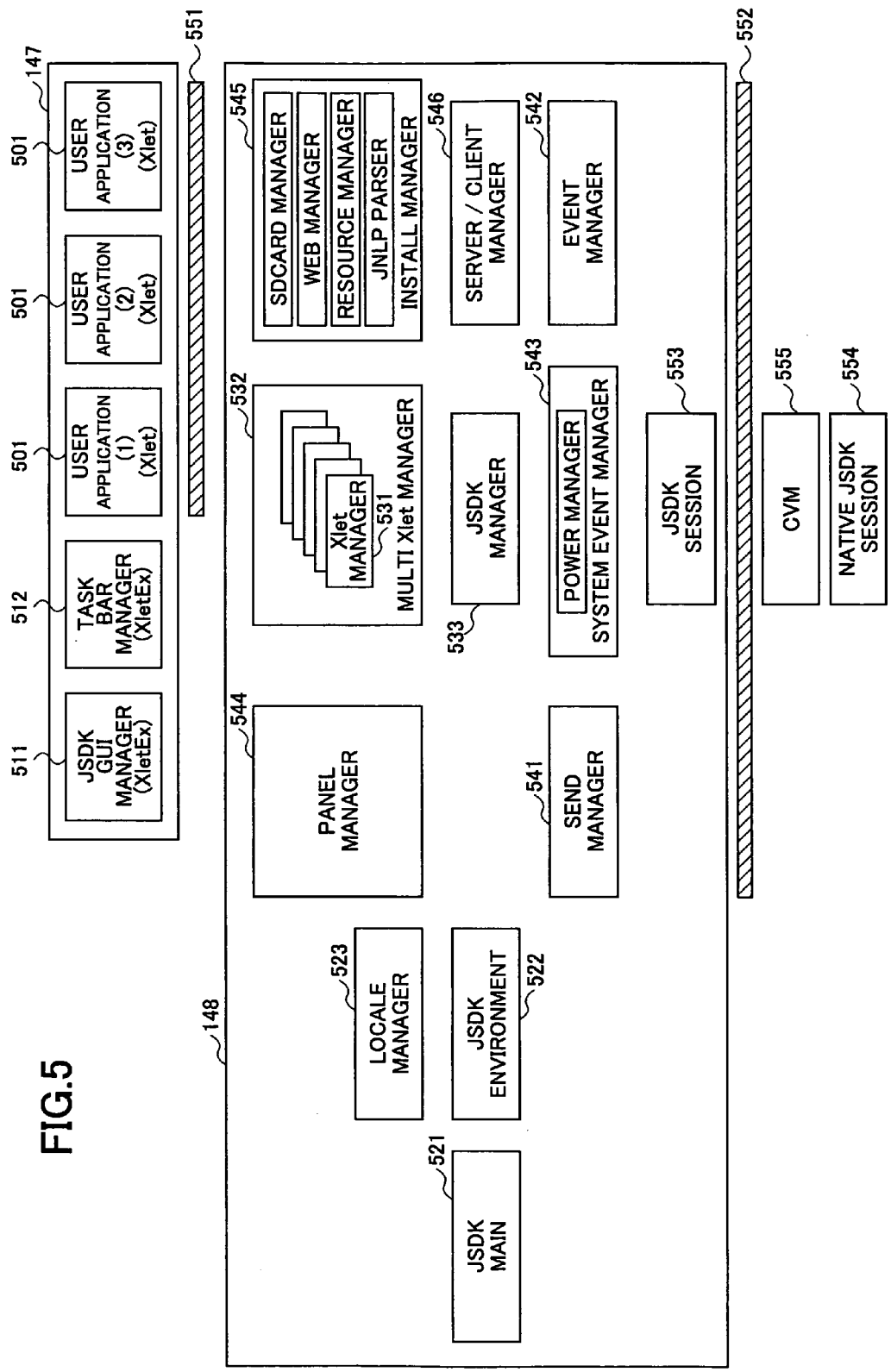
FIG. 5 is a diagram showing classes of a JSDK application and a JSDK platform shown in FIG. 1.

FIG. 5 is a diagram showing classes of the JSDK application 147 and the JSDK platform 148 shown in FIG. 1. The JSDK application 147 and the JSDK platform 148 are executed in the same process as a single process as a whole. Each block in the JSDK application 147 and the JSDK platform 148 are executed concurrently (multi-thread) by thread unit as a thread on the single process. The JSDK application 147 and the JSDK platform 148 are translated on one lump from a source code to a byte code by the Java (registered trademark) compiler, and sequentially executed by a Java (registered trademark) virtual machine. The JSDK application 147 and the JSDK platform 148 are mounted based on the personal Basis Profile of the Java (registered trademark) 2 Micro Edition.

The JSDK application 147 includes a user application 501, a JSDK GUI Manager 511, a Task Bar Manager 512, etc.

The user application 501 is a JSDK application which a user (for example, a bender) of the MFP 101 developed using JSDK. The JSDK GUI Manager 511 is a JSDK application which displays an operation screen for operating other JSDK applications (the user application 501, etc.) The Task Bar Manager 512 is a JSDK application which displays a task bar for operating other JSDK applications (the user application 501, etc.)

The user application 501 is Xlet which is the Java (registered trademark) application ranked with a standalone application and an applet. Here, the JSDK GUI Manager 511 and Task Bar Manager 512 are Xlets (XletEx) which are subjected to original extension.

In the JSDK platform 148, there are classes such as a JSDK Main 521, a JSDK Environment 522, a Locale Manager 523, an Xlet Manager 531, a Multi Xlet Manager 532, a JSDK Manager 533, a Send Manager 541, an Event Manager 542, a System Event Manager 543, a Panel Manager 544, an Install Manager 545, a Server/Client Manager 546, etc.

The JSDK Main 521 is a class which performs a starting setup of the JSDK system. The JSDK Environment 522 is a class which performs the starting environmental setup of the JSDK system. The Locale Manager 523 is a class which performs internationalization correspondence (language designation).

The Xlet Manager 531 is a class which manages the life cycle of Xlet on one-to-one basis. Here, the life cycle of five Xlets is managed by five Xlet Managers 531 on one-to-one basis. The Multi Xlet Manager 532 is a class which manages the life cycle of all Xlet Managers 531. Here, the life cycles of all the five Xlet Managers 531 are managed by one Multi Xlet Manager 532. The JSDK Manager 533 is a class which manages the life cycle of the whole JSDK system. For example, the life cycles of the Multi Xlet Manager 532, the Send Manager 541, the Event Manager 542, the System Event Manager 543, the Panel Manager 544, the Install Manager 545, and the Server/Client Manager 546 are managed by the JSDK Manager 533.

The System Event Manager 543 is a class which manages system events (electric power mode, etc.) from the platform 132 shown in FIG. 1. The Panel Manager 544 is a class which performs arbitration when one Xlet occupies the screen of the operation panel 202. The Install Manager 545 is a class which performs management of installation or uninstallation from an SD card or Web.

In the JSDK system shown in FIG. 5, there exist a JSDK API 551 and a JSDK API 552 as the API. It should be noted that, as a difference between Xlet and EletEx, there are points that the JSDK API 551 is used and the JSDK platform 148 can be accessed so as to access an object. The MPF 101 of FIG. 1 further includes, as elements relating to the JSDK system of FIG. 5, a JSDK Session 553 and a Native JSDK Session 554. Further, the MPF 101 of FIG. 1 includes, as an element relating to the JSDK system of FIG. 5, a CVM (compact virtual machine) 555 which is a Java (registered trademark) virtual machine for performing a Java (registered trademark) program which is translated in one lump from a source code to a byte code by a Java (registered trademark) compiler.

(VAS)

Figure 6:
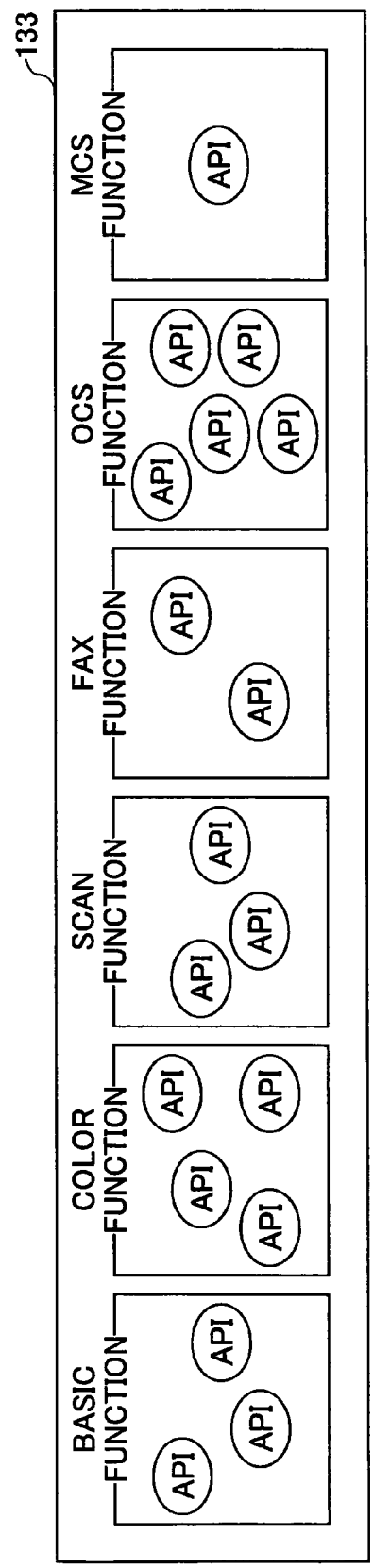
FIG. 6 is a diagram for explaining APIs mounted in the MFP shown in FIG. 1.

FIG. 6 is a diagram for explaining the APIs 133 mounted in the MFP 101 shown in FIG. 1. In order to receive a process request from the applications 131 to the platform 132, the API 133 (application program interface), which receives a process request by a previously defined function, is used. The API 133 is constituted by various kinds of APIs of as much as several hundreds kinds.

The APIs of the image forming apparatus are grouped by unit of function of the image forming apparatus, as API groups each consisting of a plurality of kinds of APIs. As kinds of API groups of the image forming apparatus, there are, for example, a "basic function API group" consisting of APIs relating to a monochrome print function, a "color function API group" consisting of APIs relating to color print function, a "scan function API group" consisting of APIs relating to monochrome copy function, a "FAX function API group" consisting of APIs relating to facsimile function, a "OCS function API group" consisting of APIs relating to operation display function such as an operation panel, and "MCS function API group" consisting of APIs relating to storage function such as local storage. It should be noted that the unit of API group is determined by a process unit, a library unit (static link library, share library or dynamic library) or a package unit (Java (registered trademark) Class library). Additionally, ones divided for each function in one unit may be used as the API group.

A description will be given below of a check process of a mount condition of the API 133 in the MFP 101. Here, the check process of a mount condition of the API 133 is a process for checking whether an API used by the JSDK application 147 is available or usable in the MFP 101 in which the JSDK 147 concerned is operated.

Figure 7:
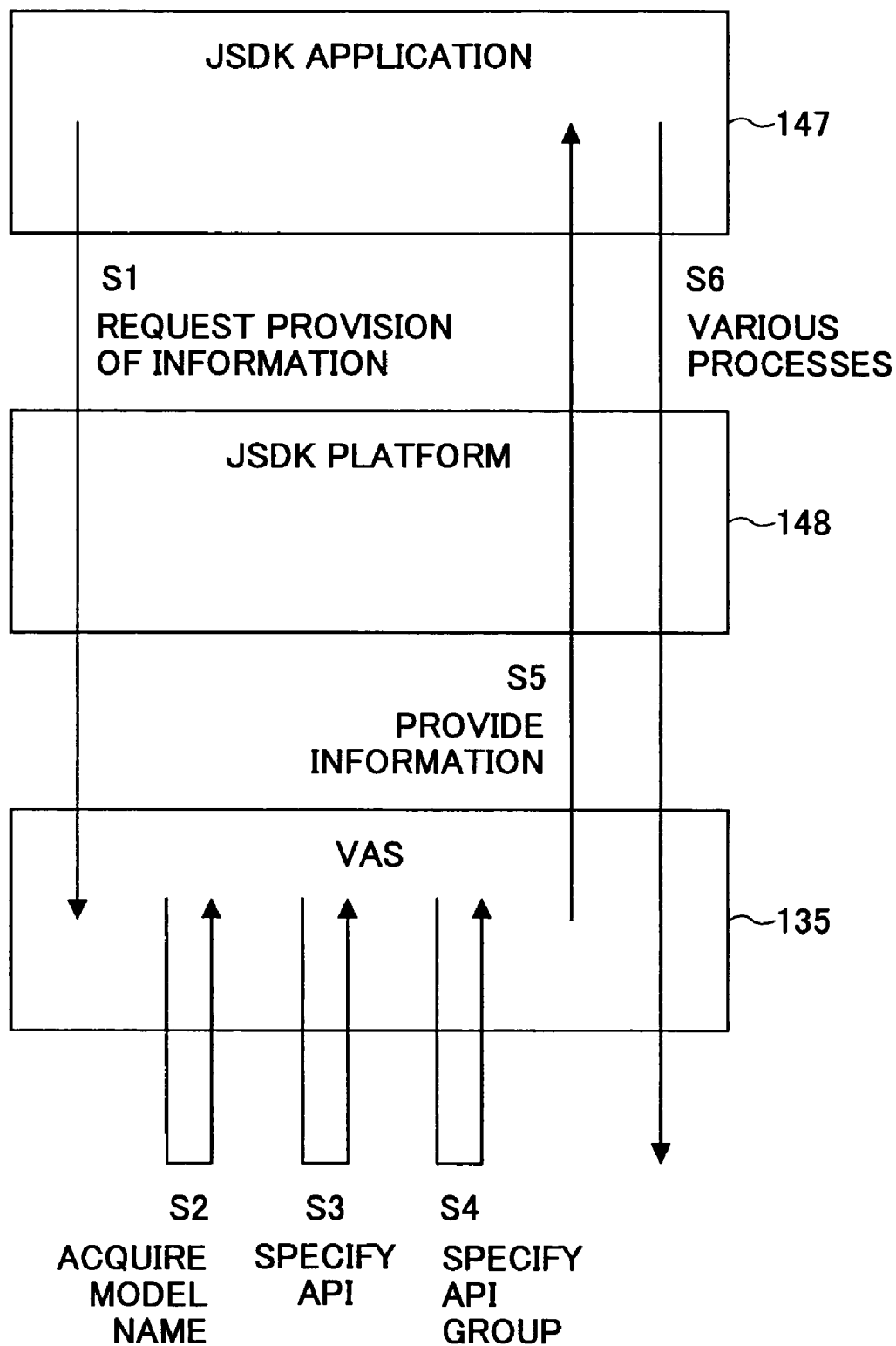
FIG. 7 is a collaboration diagram for explaining a check process of a mount condition of the APIs in a first embodiment of the present invention.

FIG. 7 is a collaboration diagram for explaining the check process of the mount condition of the APIs in a first embodiment of the present invention. FIG. 8 is a flowchart of the check process of the mount condition of the APIs in the first embodiment of the present invention.

First, a request of provision of information relating to a mount condition of the API groups of the MFP 101 is sent from the JSDK application 147 to the VAS 135 (step S1). Subsequently, the VAS 135 acquires a model name of the MFP 101 from inside the MFP 101 (step S2). Then, the VAS 135 specifies the mount condition of the APIs of the MFP 101 by the model name of the MFP 101 according to a correspondence table of the model name of the image forming apparatus and a mount condition of the APIs of the image forming apparatus (step S3). Then, the VAS 135 specifies the mount condition of the API group of the MFP 101 by the mount condition of the APIs of the MFP 101 (step S4). For example, if all kinds of APIs which constitute the basic function API group are mounted, it is determined that "the basic function API group is mounted". If, for example, one kind of the APIs which constitutes the FAX function API group is not mounted, it is determined that "the FAX function API group is not mounted". Then, information regarding the mount condition of the API groups of the MFP 101 is provided (step S5).

Then, the JSDK application 147 performs an image forming process or an image forming preparation process in accordance with the mount condition of the API groups of the MFP 101 (step S6). For example, the JSDK application 147, which is an application for color copy, displays an operation screen for color copy and an operation screen for monochrome copy on the screen of the MFP 101, when the "basic function API group", the "color function API group", and the "scan function API group" are mounted in the MFP 101. For example, if the "basic function API group" and the "scan function API group" are mounted in the MFP 101, only the operation screen for monochrome copy is displayed on the screen of the MFP 101.

Thus, the VAS 135 provides the information regarding the mount condition of the APIs of the MFP 101 to the applications 131 of the MFP 101 as information regarding the mount condition of the API groups of the MFP 101. That is, the information is provided not on an API basis but on an API group basis (function basis of the image forming apparatus). Thereby, the applications 131 of the MFP 101 are relieved from burden of handling the several hundreds kinds of APIs on an individual API basis, which permits easy handling of the several hundreds of kinds of APIs. Further, since the grouping of the API group is carried out on a function unit of the image forming apparatus, it should be pointed out that the API group can be handled easily.

A description will now be given of a specific example of the operation screen provided on the display of the MFP 101 by the JSDK application 147.

In a first example of FIG. 9A, the JSDK application 147 changes the kind of operation screen displayed on the display of the MFP 101 according to a difference in the mount condition of the API groups of the MFP 101. When the "basic function API group", the "color function API group", and the "scan function API group" are mounted in the MFP 101, the operation screen for color copy and the operation screen for monochrome copy are displayed on the display of the MFP 101 as shown in FIG. 9A (correspond to step S6). When the "basic function API group" and the "scan function API group" are mounted in the MFP 101, only the operation screen for monochrome copy is displayed on the display of the MFP 101 as shown in FIG. 9B (correspond to step S6).

Figure 10A:
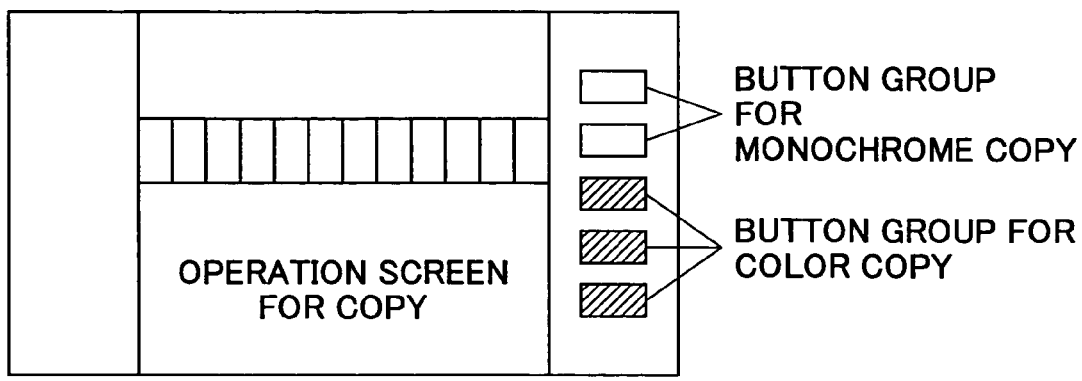
FIGS. 10A and 10B are illustrations for explaining a second example of the operation screen.
Figure 10B:
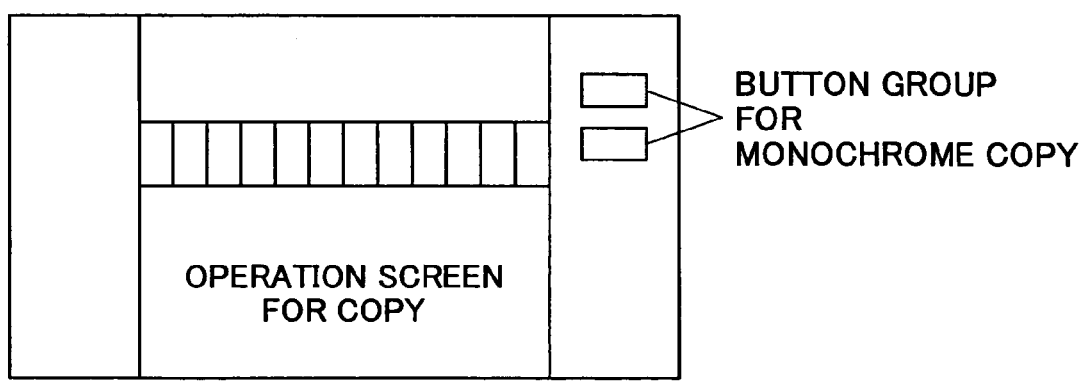

In a second example of FIG. 10, the JSDK application 147 changes the kind of display object on the operation screen of the display of the MFP 110 according to a difference in the mount condition of the API groups of the MFP 101. When the "basic function API group", the "color function API group", and the "scan function API group" are mounted in the MFP 101, a button group for monochrome copy and a button group for color copy are displayed on the operation screen for copy as shown in FIG. 10A (correspond to step S6). When the "basic function API group" and the "scan function API group" are mounted in the MFP 101, only the button group for monochrome copy is displayed on the operation screen for copy as shown in FIG. 10B (correspond to step S6). The buttons and the APIs may correspond on one-to-one basis.

It should be noted that the first example of FIGS. 9A and 9B and the second example of FIGS. 10A and 10B may be used in combination. Additionally, instead of using the first example of FIGS. 9A and 9B and the second example of FIGS. 10A and 10B in accordance with a difference in the mount condition of the APIs on an API group unit basis, they may be used in accordance with the mount condition of the APIs on an AIP unit basis. However, the API group unit basis is easier than the API unit basis.

A description will now be given of a second embodiment of the present invention. In the second embodiment, it is assumed that an upward compatibility of the API 133 is guaranteed. That is, it is assumed that the JSDK application 147 created based on the API 133 of an old version is guaranteed to be operable by the API 133 of a new version. In the present embodiment, such a guarantee can be given by the VAS 135. That is, the VAS 135 gives the upward compatibility of the API 133 by absorbing a difference in specification between the API 133 of an old version and the API 133 of a new version. Accordingly, the VAS itself has a version, and the version has a meaning as a version with respect to a unit of all API groups in the API 133 combined together. It should be noted that the unit gathering all API groups is hereinafter referred to as "all API group".

Figure 11:
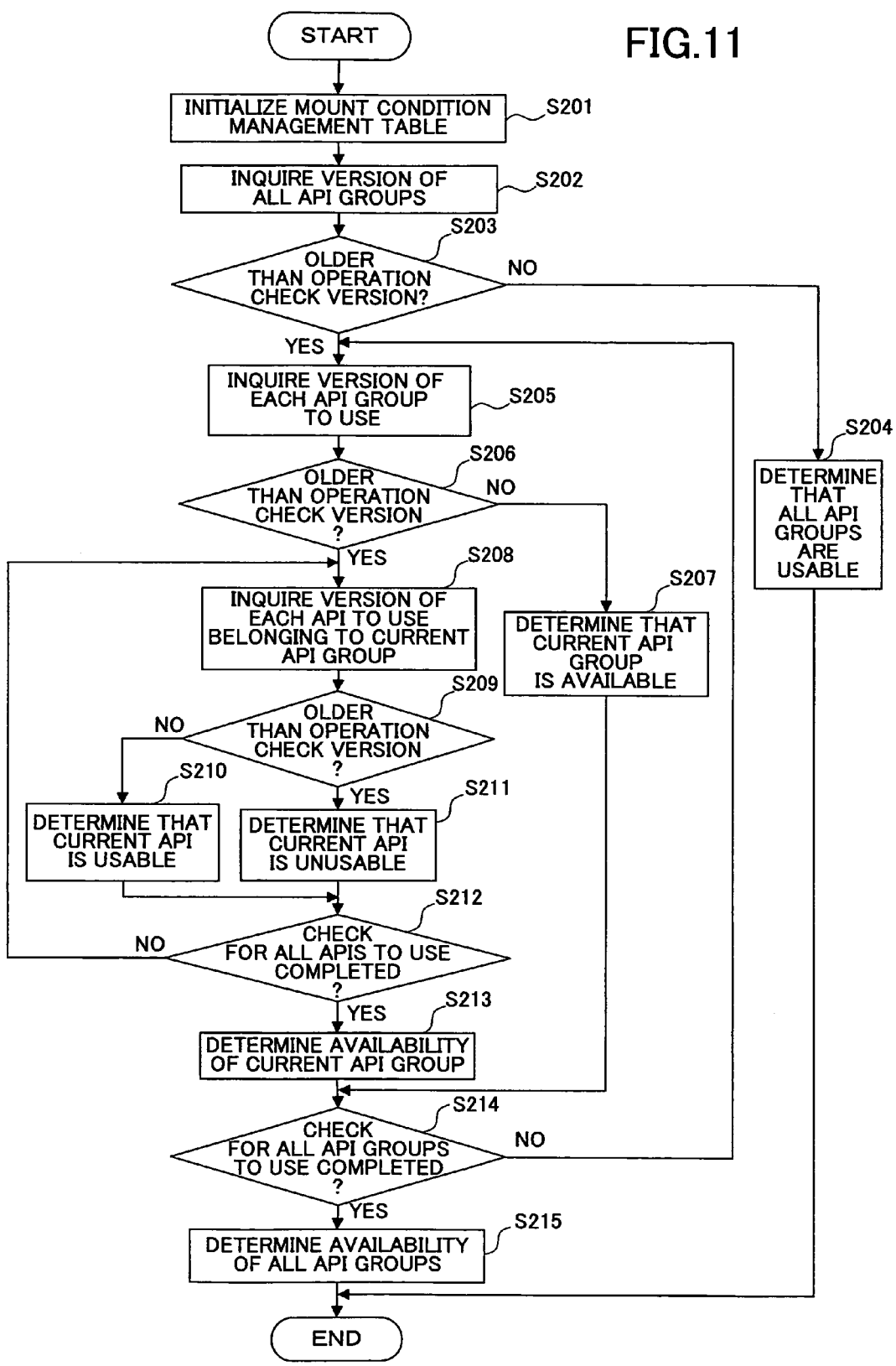
FIG. 11 is a flowchart of a check process of a mount condition of the APIs according to a second embodiment of the present invention.

FIG. 11 is a flowchart of the check process of the mount condition of the APIs according to the second embodiment of the present invention.

In step S201, the JSDK application 147 builds a mount condition management table on the memory, and initializes the contents thereof.

FIG. 12 is a diagram showing the mount condition management table after initialization. As shown in FIG. 12, the mount condition management table 1471 is a table for managing an operation checked version of the JSDL application and its validity for each of the API group and the API, which the JSDK application uses (hereinafter refereed to as "use API group" and "use API", respectively). The operation checked version is a version of each API group and each API in an environment where an operation check of the JSDK application was performed. As mentioned later, the JSDK application 147 recognizes each version of which operation has been checked by itself, and registers the version, of which operation has been checked, in the mount condition management table 1471 in the initialization process based on the recognition.

The validity is information which indicates availability or usability (whether or not it can be used) of each API group and each API in the MFP 101. As for the API groups, the validity indicates one of VOID (use is impossible), READY (use is possible) and PARTLY (use is possible in part). As for the APIs, the validity indicated one of VOID and READY. As for the availability of each API group and each API, the validity is initialized as VOID first since it is determined in a subsequent process.

The mount condition management table 1471 also expresses a hierarchical structure of the API groups and the APIs. That is, it is expressed that a monochrome scan API group includes scanFunc001, scanFunc002 and scanFunc003, and the color scan API group includes the APIs contained in the monochrome scan group and scanFunc004.

It should be noted that the description "self" in column of "API" in the mount condition management table 1471 means the API group itself. Therefore, in FIG. 12, the operation-checked version of the monochrome scan API group is "1.10", and the operation-checked version of the color scan API group is "1.20".

Then, the JSDK application 147 inquires the VAS 135 about a mounted version as information regarding the mount condition of all API groups (here, the VAS 135) (step S202). Here, the mounted version means a version actually mounted in the MFP 101.

The inquiry is performed using a mount condition acquisition function as shown in FIG. 13. FIG. 13 is a diagram showing an example of the mount condition acquisition function.

The mount condition acquisition function is prepared for each API group and each API. Any function returns version information of the API group or the API, to which the function corresponds, to an argument of an OUT type. Here, "getAPIVersion( )" is used for the inquiry of the version information of all API groups.

In response to the call of getAPIVersion( ), the VAS 135 returns and stores the current mounted version in the argument thereof.

Then, the JSDK application 147 compares the mounted version of all API groups returned by getAPIVersion( ) with the operation-checked version of all API groups registered in the mount condition management table 1471 (step S203). If the mounted version and the operation-checked version are the same or if the mounted version is newer than the operation-checked version (No of step S203), the JSDK application 147 determines that all API groups are available, that is, all API groups can be used (step S204). It should be noted that if all API groups are available, it is guaranteed that each use API group and each use API is available. Therefore, in such as case, the JSDK application 147 sets the value of validity of all API groups and all APIs in the mount condition management table 1471 to "READY", and the process is ended.

FIG. 14 is a diagram showing an updated state of the mount condition management table when the mounted version is determined as not old with respect to all API groups. In the mount condition management table 1471 shown in FIG. 14, the values of validity of all API groups and all APIs are set to "READY". Thus, if it is determined that the mounted version is not old with respect to all use API groups, there is no need to check the version of each use API group and each use API. Therefore, the JSDK application 147 can efficiently determine whether or not each use API group and each use API can be used.

On the other hand, if the mounted version is older than the operation-checked version (YES in step S203), the JSDK application 147 inquires the VAS 135 about the version of each use API group (in FIG. 12, the monochrome scan API group and the color scan API group) according to the mount condition acquisition function (step S205).

Then, the JSDK application 147 compares the mounted version of each use API group returned from the VAS 135 with the operation-checked version of each use API group registered in the mount condition management table 1471 (step S206). The use API group of which both versions are the same or the mounted version is newer is determined as available (step S207). In such a case, it is guaranteed that not only the use API group but also APIs belonging to the use API group concerned are available or usable. Therefore, the JSDK application 147 sets the values of validity of the use API group and all use APIs belonging to the use API group in the mount condition management table 1471 to "READY", as shown in FIG. 15.

FIG. 15 is a diagram showing an updated state of the mount condition management table when the mounted version is not old with respect one use API group. In FIG. 15, it is determined that the mounted version of the monochrome scan API group is not old, and in association with that, the validity of the use APIs (scanFunc001, scanFunc002, scanFunc003) belonging to the monochrome scan API group and the monochrome scan API group are set to "READY". As mentioned above, if it is determined that the mounted version is not old with respect to one API group, there is no need to check each use API belonging to the API group concerned, and the JSDK application 147 can efficiently determine whether or not each use API can be used.

On the other hand, with respect to the use API group of which mounted version is old, a comparison between the mounted version and the operation-checked version is performed for each use API belonging to the use API group concerned. That is, the JSDK application 147 acquires the mounted version of each use API belonging to the use API group concerned from the VAS 135 according to the mount condition acquisition function (step S208), and compares the acquired version with the operation-checked version of the use API registered in the mount condition management table 1471 (step S209).

As a result of the comparison, if both versions are the same or the mounted version is newer (NO of step S209), the JSDK application 147 determines that the use API concerned is available, and set the validity of the use API in the mount condition management table to "READY" (step S210). On the other hand, if the mounted version is older (YES of step S209), the JSDK application 147 determines that the use API is not available or unusable (step S211), and the validity is maintained as "VOID".

If the determination of availability for all use APIs belonging to each of the use API groups of which operation-checked version is older is completed (YES of step S212), the JSDK application 147 determines availability of the use API group by referring to the mount condition management table 1471 (step S213) as mentioned below. First, if all use APIs belonging to the use API group can be used (READY), it is determined that the use API group concerned is available, and the validity of the use API in the mount condition management table 1471 is set to "READY". On the other hand, if all use APIs belonging to the use API group cannot be used (VOID), it is determined that the use API group concerned is not available, and the validity of the use API in the mount condition management table 1471 is maintained as "VOID". If only a part of use APIs belonging to the use API group can be used (READY), it is determined that the use API group concerned is partly available, and the validity of the use API in the mount condition management table 1471 is set to "PARTLY". However, when the validity of the use API indispensable for a specific function (for example, a color scan function) which the use API group realizes is "VOID", the validity of the use API group concerned is maintained as "VOID".

FIG. 16 is a diagram showing an updated state of the mount condition management table when availability of use API group is determined based on the result of determination of availability of each use API. In the mount condition management table 1471, the validity of the monochrome scan API group belonging to the color scan API group is "READY" and scanFunc004 is "VOID". Therefore, the result of determination as "VOID" is reflected. That is, since use of scanFunc004 is indispensable in order to realize the color scan function, the validity of the color scan API group is set "VOID" instead of "PARTLY".

Then, when the determination of availability for all use API groups is completed (YES of step S214), the JSDK application 147 determines availability of all use API groups by referring to the mount condition management table 1471 (step S215) as mentioned below. First, if all use API groups can be used (READY), it is determined that all use API groups are available, and the validity of all use API groups in the mount condition management table 1471 is set to "READY". On the other hand, if all use APIs belonging to all use API groups cannot be used (VOID), it is determined that all use API groups are not available, and the validity of all use API groups in the mount condition management table 1471 is maintained as "VOID". If not all use API group are unavailable but there is contained a use API group which is unavailable (VOID) or a use API group of which a part is available (PARTLY), it is determined that all use API groups are partly available, and the validity of all use API groups in the mount condition management table 1471 is set to "PARTLY".

FIG. 17 is a diagram showing an updated state of the mount condition management table when availability of all API groups is determined based on a result of determination of availability of each use API group. In the mount condition management table shown in FIG. 17, the validity of the monochrome scan API group is "READY", and the validity of the color scan API group is "VOID". Therefore, the result of the determination that all API group is "PARTLY" is reflected.

Thereafter, the JSDK application 147 performs a display control of the screen, which was explained in FIG. 9 or FIG. 10 and other operation controls with reference to the mount condition management table 1471.

A description will now be given of a process for causing the JSDK application 147 to recognize its own operation-checked version. The process is performed in the development or test process of the JSDK application 147.

Figure 18:
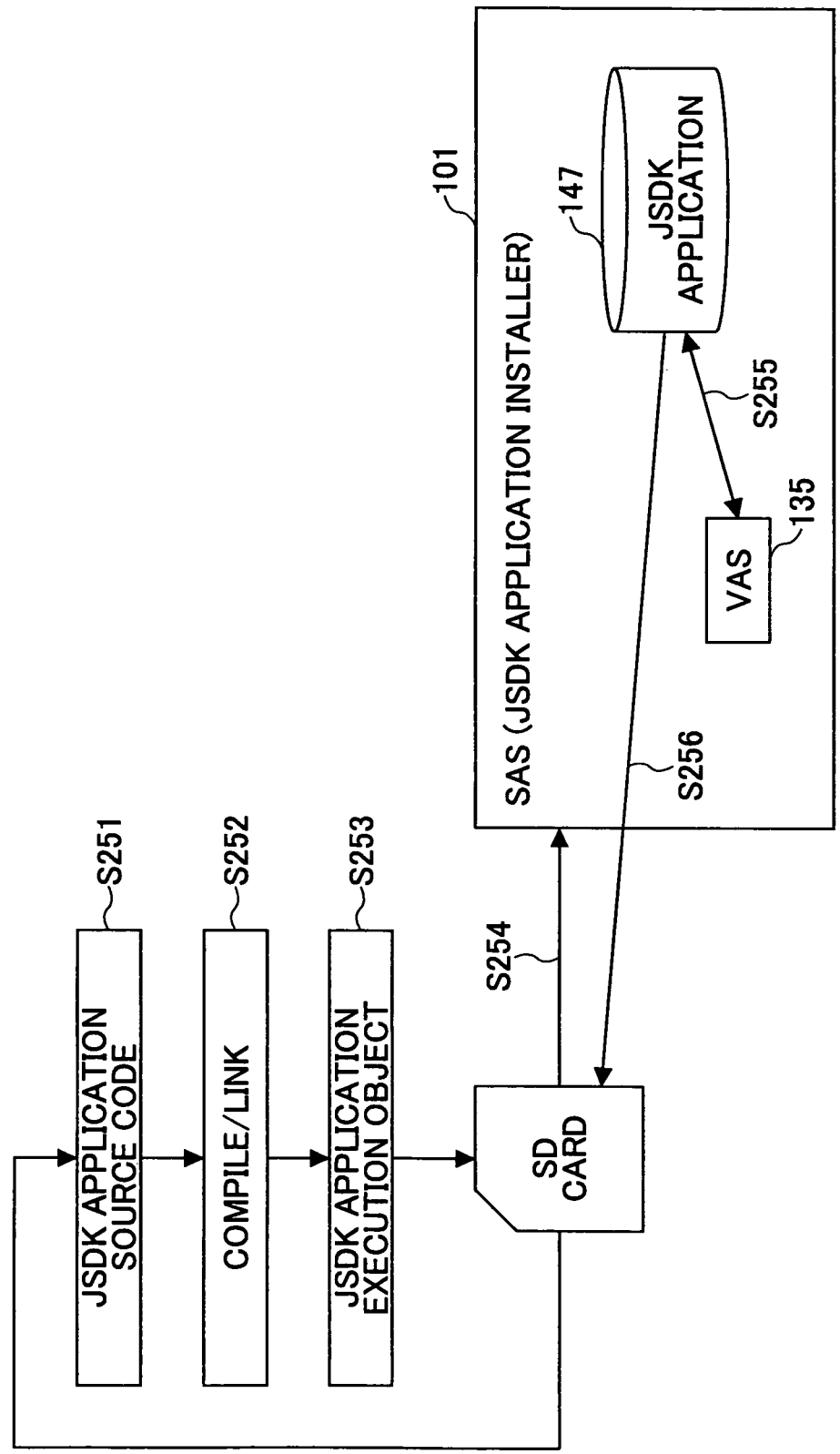
FIG. 18 is a diagram for explaining a process for causing the JSDK application to recognize an operation-checked version.

FIG. 18 is a diagram for explaining the process for causing the JSDK application to recognize the operation-checked version.

First, the source code of the JSDK application 147 is created by the developer (step S251). Then, the compile and link of the source code are carried out so as to create an execution object of the JSDK application 147(step S252), and the execution object is stored in a predetermined recording medium (for example, an SD card) (step S253). When the SD card is inserted into the MFP 101 for operation check (step S254), the SAS 183 install the JSDK application 147 in the MFP 101 concerned, and an operation of the JSDK application. 147 is started. The JSDK application 148 started by the SAS 183 acquires the version of each use API group and each use API (step S255), and writes the contents in the source code of the JSDK application 147 in the SD card.

FIG. 19 is a diagram showing an example of a version of API group and API written in the source code of the JSDK application. In the example shown in FIG. 19, versions of API groups and APIs are written as values of macro embedded in the source code of the JSDK application. Thereafter, the JSDK application 147 is recompiled and linked based on the source code written in the SD card. If an operation of the execution module created by the recompile and link is confirmed in the MFP 101, this means that the JSDK application 147 is caused to recognize the operation-checked version.

It should be noted that the operation-checked version may be recognized by storing the operation-checked version in a predetermined file instead of writing in the source code and reading the predetermined file by the JSDK application 147 during operation.

In the meantime, in the second embodiment, the example in which the JSDK application 147 determines availability of the API groups or APIs was explained. However, the determination of availability of the API groups or the APIs is not always necessarily performed by the JSDK application 147, and the VAS 135 may be caused to perform the determination and the JSDK application may receive a result of the determination. Then, a description will be given of an example where the VAS 135 performs determination of availability of API groups and APIs, as a third embodiment of the present invention. It should be noted that points other than mentioned below are the same as the above-mentioned second embodiment.

FIG. 20 is a flowchart for explaining a check process of a mount condition of APIs according to the third embodiment of the present invention.

In step S301, the JSDK application 147 builds a mount condition management table on a memory, and initializes the contents thereof. According to this process, the mount condition management table 1471 is set in the state shown in FIG. 12.

Then, the JSDK application 147 inquires the VAS 135 about availability of the VAS 135 (step S302).

The inquiry is performed using a mount condition acquisition function such as shown in FIG. 13. However, the method of use is different in the third embodiment. That is, the argument of the mount condition acquisition function is an IN-type argument, and the JSDK application 147 designates the operation-checked version. Then, an integer value (0, 1, 2) assigned as a value indicating READY, PARTLY or VOID is returned as a return value. Accordingly, "getAPIVersion ("1.50")" is called in response to the inquiry about availability of all API groups.

In response to the call of "getAPIVersion( )", the VAS 135 acquires the mounted version of all API groups, and compares the mounted version with the operation-checked version transferred to the argument of "getAPIVersion( )". As a result of the comparison, if the mounted version is the same as or newer than the operation-checked version, the VAS 135 determined that all API groups are available, and returns a result of determination (READY). On the other hand, if the mounted version is older than the operation-checked, the VAS 135 returns the partly available (PARTLY).

If the value returned from the VAS 135 is "READY" ("READY" of step S303), the JSDK application 147 sets the values of validity of all API groups and APIs in the mount condition management table 1471 to "ready", and ends the process.

On the other hand, if the value returned from the VAS 135 is "PARTLY" ("PARTLY" of step S303), the JSDK application 147 inquiries the VAS 135 about availability of each use API group by designating the operation-checked version of each use API group to the argument of the mount condition acquisition function (step S305).

In response to the call for the mount condition acquisition function, the VAS 135 acquires the mounted version of each use API group, and compares the mounted version with the operation-checked version transferred to the argument of the mount condition acquisition function. As a result of the comparison, if the mounted version is the same as or newer than the operation-checked version, the VAS 135 determines that the use API group concerned is available, and returns the result of the determination (READY). On the other hand, if the mounted version is older than the operation-checked version, the VAS 135 returns a value (PARTLY) indicating that it is partly available.

If the value returned from the VAS 135 is "READY" ("READY" of step S306), the JSDK application 147 sets the value of validity of the use API group and all APIs belonging to the use API group concerned in the mount condition management table 1471 to "READY", as shown in FIG. 15

On the other hand, if the value returned from the VAS 135 is "PARTLY" ("PARTLY" of step S306), the JSDK application 147 inquires the VAS 135 about availability of each use API by designating the operation-checked version of each use API belonging to the use API group concerned to the argument of the mount condition acquisition function (step S308).

In response to the call for the mount condition acquisition function, the VAS 135 acquires the mounted version of each use API, and compares the mounted version with the operation-checked version transferred to the mount condition acquisition function. As a result of the comparison, if the mounted version is the same as or newer than the operation-checked version, the VAS 135 determines that the use API concerned is available, and returns the result of the determination (READY). On the other hand, if the mounted version is older than the operation-checked version, the VAS 135 returns a value (VOID) indicating that it is not available.

If the value returned from the VAS 135 is "READY" ("READY" of step S309), the JSDK application 147 sets validity of the use API in the mount condition management table 1471 to "READY" (step S310). On the other hand, if the value returned from the VAS 135 is "VOID" (YES of step S309), the JSDK application 147 maintains the validity of the use API concerned in the mount condition management table 1471 as "VOID" (step S311).

When the inquiry about availability of all use API belonging to the use API group of which availability is determined as "PARTLY" is completed (YES of step S312), the JSDK application 147 determines availability of the use API concerned by referring to the mount condition management table 1471 (step S313). First, if all use APIs belonging to a use API group can be used (READY), the use API group concerned is determined as available, and the validity of the API group concerned in the mount condition management table 1471 is set to "READY". On the other hand, if all use APIs belonging to a use API group cannot be used (VOID), the use API group concerned is determined as unavailable, and the validity of the use API group concerned in the mount condition management table 1471 is maintained as "VOID". If only a part of the APIs belonging to the use API group is available (READY), the use API group is determined as partly available, and the validity of the use API group in the mount condition management table 1471 is set to "PARTLY".

However, if the validity of a use API indispensable for a specific function (for example, the color scan function) realized by the use API group concerned is "VOID", the validity of the API group concerned is maintained as "VOID".

Then, when the inquiry about availability of all use API groups is completed (YES of step S314), the JSDK application 147 determines availability of the all API groups concerned by referring to the mount condition management table 1471 (step S315). First, if all use API groups can be used (READY), all use API groups are determined as available, and the validity of all API groups concerned in the mount condition management table 1471 is set to "READY". On the other hand, if all use APIs belonging to all use API groups cannot be used (VOID), all API groups are determined as unavailable, and the validity of all use API groups in the mount condition management table 1471 is maintained as "VOID". If not all use API groups belonging to all API groups are unavailable but unavailable (VOID) or partly available (PARTLY) use API group is contained, it is determined that the all API group is available, and the validity of all API groups in the mount condition management table 1471 is set to "PARTLY".

As mentioned above, even if the determination of availability is performed by the VAS 135, the same result as the second embodiment can be acquired. It should be noted that although the example in which an inquiry is performed by the JSDK application for each API group an each API was explained above, inquiry about availability may be performed by the JSDK application collectively, and the VAS may determine the availability of each API group and each API in a background of the JSDK application so as to create the mount condition management table 1471 based on a result of the determination.

Moreover, the process explained as performed by the VAS 135 may be performed by a process (for example, the SAS 183) for starting the JSDK application 147.

In the meantime, the timing of performing the check process of the mount condition of APIs explained above is not limited to the time of executing the JSDK application 147 but the time of installing the JSDK application 147. FIG. 21 is a flowchart for explaining a process of installing the JSDK application accompanying the check process of the mount condition of APIs.

When a user inserts an SD card, in which the JSDK application 147 (operation-checked version) is stored, into the MFP 101 (step S401), and turns ON the power of the MFP 101 (step S402), the SAS 183 of the MFP 101 starts an uninstallation function of an application, and displays a list of the JSDK application 147 in the SD card on the operation panel 202 (step S403).

The user selects the JSDK application 147 to be installed from the list displayed on the operation panel 202 and designates a start of the installation (step S404), the SAS 183 reads the selected JSDK application from the SD card, and creates a copy of the JSDK application in the HDD 233 (step S405). After the copy is completed, the SAS 183 start an operation of the JSDK application 147 concerned in an API check mode (step S406).

The JSDK application started in the API check mode does not perform a process of realizing the original function but performs the check process of the mount condition of APIs as mentioned with reference to FIG. 8, FIG. 11 and FIG. 20 (step S407), and stores a result of check, that is, the contents of the mount condition management table 1471, in the SD card or the HDD 233.

Thereafter, when the JSDK application 147 is started, the JSDK application 147 does not need to perform the check process each time, and a control process of displaying the screen explained with FIG. 9 or FIG. 10 by referring to the stored check result. However, it is considered that a version upgrade of the VAS 135 and the API 133 is performed after the installation of the JSDK application. Considering such a possibility, the SAS 183 may be caused to always monitor such a version upgrade. If the SAS 183 detects the version upgrade, the installed JSDK application 147 is started in the API mode so as to newly store a result of check.

It should be noted that the API groups or APIs which are determined as available may be downloaded from a predetermined file server through a network so as to make a function relating to the API groups available.

(Variation)

The MFP 101 of FIG. 1 corresponds to an embodiment of the image forming apparatus according to the present invention, and the information process performed by the MFP 101 of FIG. 1 corresponds to the information processing method according to the present invention. The VAS 135 and the JSDK application 147 of FIG. 1 correspond to an embodiment of the information processing program according to the present invention. A CD-ROM, a DVD-ROM or an SD card on which the VAS 135 or the JSDK application 147 is recorded an embodiment corresponding to the recording medium according to the present invention.

The present invention is not limited to the specifically disclosed embodiments, and variations and modifications may be made without departing from the scope of the present invention.

The present application is based on Japanese priority applications No. 2004-303135 filed Oct. 18, 2004 and No. 2005-293892 filed Oct. 6, 2005, the entire contents of which are hereby incorporated herein by reference.

What is claimed is:

1. An image forming apparatus comprising:
    a plurality of programs of which an interface is open to public so that an application created according to said interface is executable;
    a management table indicating a mount condition of a group of application program interfaces mounted in the image forming apparatus;
    a processor configured to specify the mount condition of the group of application program interfaces mounted in the image forming apparatus by referring to the management table to display information to a user of the image forming apparatus indicating an availability of the group of application program interfaces so that when at least one application program interface, which is not mounted in the image forming apparatus, exists in a group of application program interfaces constituting the application, application is omitted from the information displayed to the user of the image forming apparatus, and when all of the group of application program interfaces constituting the application are mounted in the image forming apparatus, the application is displayed to the user of the image forming apparatus; and
    a virtual application service configured to receive the request from the application and determine the available group of application program interfaces by determining a model name of the image forming apparatus and accessing the management table that includes a list of available application program interfaces corresponding to each of a plurality of model names.

2. The image forming apparatus as claimed in claim 1, wherein said application controls an operation control of the application based on the information indicating said availability of the group of application program interfaces provided by said processor.

3. The image forming apparatus as claimed in claim 2, wherein said application limits a function provided by the application based on the information indicating the availability of the group of application program interfaces provided by said processor.

4. The image forming apparatus as claimed in claim 2, wherein said application changes contents of a screen displayed on an operation panel of said image forming apparatus based on the information indicating the availability of the group of application program interfaces provided by said processor.

5. The image forming apparatus as claimed in claim 4, wherein said application displays said screen so that a function and an operation not limited is permitted based on the information indicating the availability of the group of application program interfaces provided by said processor.

6. The image forming apparatus as claimed in claim 1, wherein the availability of the group of application program interfaces is determined for each application program interface in accordance with the information indicating the availability of the group of application program interfaces provided by said processor.

7. The image forming apparatus as claimed in claim 1, wherein the mount condition management table is a correspondence table that indicates a model number of the image forming apparatus and the mount condition of the group of application program interfaces so that the mount condition of the group of application program interfaces mounted in the image forming apparatus is acquired by referring to the correspondence table according to the model name of the image forming apparatus.

8. The image forming apparatus as claimed in claim 1, wherein the mount condition management table is a correspondence table that indicates a version number of the group of application program interfaces and the mount condition of the group of application program interfaces so that the mount condition of the group of application program interfaces mounted in the image forming apparatus is acquired by referring to the correspondence table according to the version number of the group of application program interfaces.

9. An information processing method performed by an image forming apparatus that has a plurality of programs of which an interface is open to public so that an application created according to said interface is executable, the image forming method comprising:
    storing, at a memory of the image forming device, a management table indicating a mount condition of a group of application program interfaces mounted in the image forming apparatus;
    a mount condition providing procedure of specifying the mount condition of the group of application program interfaces mounted in the image forming apparatus by referring to the management table to display information to a user of the image forming apparatus indicating an availability of the group of application program interfaces so that when at least one application program interface, which is not mounted in the image forming apparatus, exists in a group of application program interfaces constituting the application, application is omitted from the information displayed to the user of the image forming apparatus, and when all of the group of application program interfaces constituting the application are mounted in the image forming apparatus, application is displayed to the user of the image forming apparatus; and determining the available group of application program interfaces by determining a model name of the image forming apparatus and accessing the management table that includes a list of available application program interfaces corresponding to each of a plurality of model names.

10. The information processing method as claimed in claim 9, wherein said application controls an operation control of the application based on the information indicating said availability of the group of application program interfaces provided by said mount condition providing procedure.

11. The information processing method as claimed in claim 10, wherein said application limits a function provided by the application based on the information indicating the availability of the group of application program interfaces provided by said mount condition providing procedure.

12. The information processing method as claimed in claim 10, wherein said application changes contents of a screen displayed on an operation panel of said image forming apparatus based on the information indicating the availability of the group of application program interfaces provided by said mount condition providing procedure.

13. The information processing method as claimed in claim 12, wherein said application displays said screen so that a function and an operation not limited is permitted based on the information indicating the availability of the group of application program interfaces provided by said mount condition providing procedure.

14. The information processing method as claimed in claim 9, wherein the mount condition is determined for each application program interface belonging to the group in accordance with the information indicating the availability of the group of application program interfaces provided by said mount condition providing procedure.

15. A non-transitory computer-readable storage medium storing a program for causing a computer as an image forming apparatus to perform an information processing method, the image forming apparatus having a plurality of programs of which an interface is open to public so that an application created according to said interface is executable, the image forming method comprising:

storing, at a memory of the image forming device, a management table indicating a mount condition of a group of application program interfaces mounted in the image forming apparatus a mount condition providing procedure of specifying the mount condition of the group of application program interfaces mounted in the image forming apparatus by referring to the management table to display information to a user of the image forming apparatus indicating an availability of the group of application program interfaces so that when at least one application program interface, which is not mounted in the image forming apparatus, exists in a group of application program interfaces constituting the application, the application is omitted from the information displayed to the user of the image forming apparatus, and when all of the group of application program interfaces constituting the application are mounted in the image forming apparatus, the application is displayed to the user of the image forming apparatus; and determining the available group of application program interfaces by determining a model name of the image forming apparatus and accessing the management table that includes a list of available application program interfaces corresponding to each of a plurality of model names.

16. The non-transitory computer-readable storage medium as claimed in claim 15, wherein said application controls an operation control of the application based on the information indicating said availability of the group of application program interfaces provided by said mount condition providing procedure.

17. The non-transitory computer-readable storage medium as claimed in claim 15, wherein the mount condition is determined for each program belonging to the group in accordance with the information indicating the availability of the group of application program interfaces provided by said mount condition providing procedure.

* * * * *